United States Patent
Cusson et al.

(10) Patent No.: US 6,424,876 B1
(45) Date of Patent: *Jul. 23, 2002

(54) STATISTICAL PROCESS CONTROL SYSTEM WITH NORMALIZED CONTROL CHARTING

(75) Inventors: Brian K. Cusson, Austin; James Sharier, Pflugerville; Justin Giguere; Anatasia Oshelski, both of Austin, all of TX (US)

(73) Assignee: Advanced Micro Devices, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,988

(22) Filed: Jul. 22, 1999

(51) Int. Cl.[7] .............................................. G06F 19/00
(52) U.S. Cl. ........................ 700/108; 700/51; 702/183
(58) Field of Search ........................ 700/108, 51, 121, 700/109; 702/183, 184, 187

(56) References Cited

U.S. PATENT DOCUMENTS

| | | | | |
|---|---|---|---|---|
| 5,291,415 A | * | 3/1994 | Zarowin et al. | 700/188 |
| 5,930,138 A | * | 7/1999 | Lin et al. | 700/108 |
| 5,949,682 A | * | 9/1999 | Dickinson et al. | 700/121 |
| 5,999,886 A | * | 12/1999 | Martin et al. | 702/31 |
| 6,161,054 A | * | 12/2000 | Rosenthal et al. | 700/121 |
| 6,258,610 B1 | * | 7/2001 | Blatchford et al. | 438/14 |
| 6,263,255 B1 | * | 7/2001 | Tan et al. | 700/121 |
| 6,303,395 B1 | * | 10/2001 | Nulman | 438/14 |
| 6,317,211 B1 | * | 11/2001 | Ausschnitt et al. | 356/401 |

* cited by examiner

Primary Examiner—Leo Picard
Assistant Examiner—Zoila Cabrera
(74) Attorney, Agent, or Firm—Williams, Morgan & Amerson, P.C.

(57) ABSTRACT

A method for monitoring the performance of a manufacturing entity is provided. Metrology data indicating an output parameter of the manufacturing entity is retrieved. The output parameter has an associated target value. The metrology data is normalized based on the target value to generate normalized performance data points. A performance rule violation is determined based on the normalized performance data. A manufacturing system includes a metrology tool, a first database, and a processor. The metrology tool is adapted to measure an output parameter of a manufacturing entity to generate metrology data. The output parameter has an associated target value. The first database is adapted to receive the metrology data. The processor is adapted to retrieve the metrology data from the database, normalize the metrology data based on the target value to generate normalized performance data points, and determine a performance rule violation based on the normalized performance data.

42 Claims, 5 Drawing Sheets

STATISTICAL PROCESS CONTROL SYSTEM WITH NORMALIZED CONTROL CHARTING

BACKGROUND OF THE INVENTION

1. Field of the Invention

This invention relates generally to process control, and, more particularly, to a system for performing statistical process control using normalized control charts.

2. Description of the Related Art

Statistical process control techniques are commonly used to monitor the operation of manufacturing processes, systems, or individual manufacturing tools. Commonly, various measurements related to the process being monitored are compiled and plotted on a control chart. The control chart has control limits, that, if violated, indicate an error condition requiring investigation. Certain error conditions result from special causes, such as a defective tool, operator error, material defect, etc., while other errors may indicate common causes, such as process changes or trends that may be corrected by process optimization or redesign.

Generally, the data gathered is evaluated against various rules to determine if an error condition has occurred. Although, various rules may be used, many companies have adopted the "Western Electric Rules," originally developed by the Western Electric Company. The rules specify that an error occurs if:

Rule 1: One measurement exceeds three standard deviations from the target (i.e., 1>3σ);

Rule 2: Two out of three consecutive measurements exceed two standard deviations from the target (i.e., 2/3>2σ), Rule 3: Four out of Five consecutive measurements exceed one standard deviation from the target (i.e., 4/5>σ); and Rule 4: Eight consecutive points on one side of the target.

Figure 1:
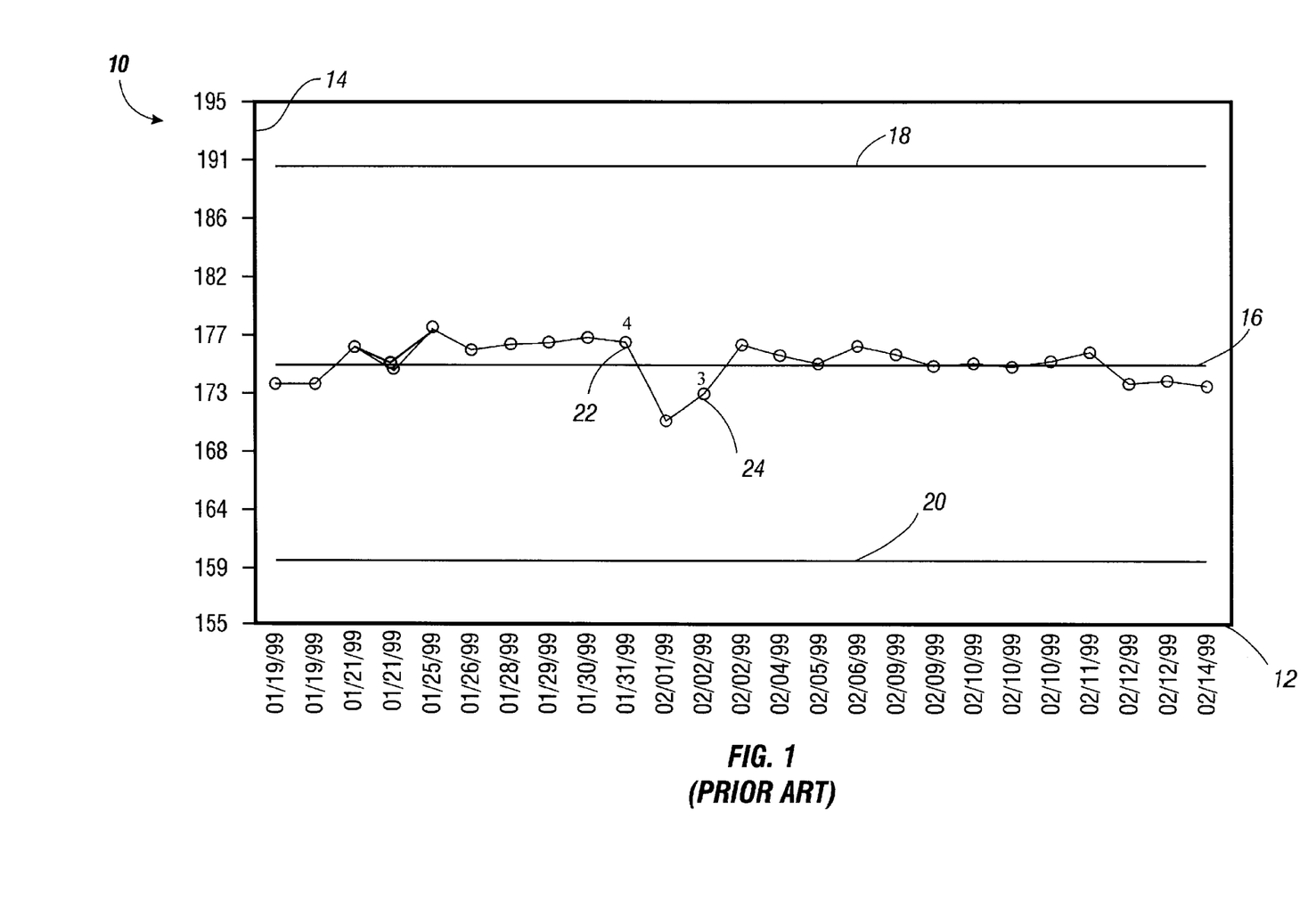
FIG. 1 is a diagram of a typical control chart used to monitor the performance of a manufacturing line, process, or tool.

Referring to FIG. 1, a graph of a typical control chart 10 is provided. The control chart may represent any number of measurements pertaining to a particular line, process, or tool, for example. On the x-axis 12, the measurement dates are recorded. The y-axis 14 represents the measurement values. The target for the process being measured is designated by a target line 16 (e.g., 175). Upper and lower control limits 18, 20 are also shown. In the control chart of FIG. 1, exceeding the control limits 18, 20, corresponds to a rule 1 violation, i.e., the measurement deviating from the target by more than three standard deviations. The data point 22 represents the eighth consecutive data point on the positive side of the target, resulting in a rule 4 violation. Also, the data point 24 represents the fourth data point out of five exceeding one standard deviation from the target, a rule 3 violation.

In some applications, a particular line, process, or tool may be used with various operating parameters to accomplish different tasks. For example, a tool commonly used in the manufacture of semiconductor devices is a furnace. Semiconductor wafers are baked in the furnace using different parameters to control the formation of an oxide layer, for example. Typically, for each lot of wafers, measurements are taken in different positions in the furnace (e.g., sets of top, center, bottom, left, and right measurements at front, middle, and rear positions in the furnace—5 measurements×3 positions=15 total measurements). The individual lot measurements are averaged to determine a single data point for inclusion on the control chart. Control charting is conducted on various measurable parameters, such as oxide thickness. A particular furnace may use numerous recipes (i.e., sets of operating parameters), depending on the specific desired qualities of the oxide layer being grown. The particular recipe used by the furnace may be changed frequently.

Control charting the performance of the furnace using multiple recipes is burdensome, because the targets and control limits are different for each recipe. Accordingly, measurement data is independently charted for each recipe, yielding a large number of control charts requiring review. The problem with the large number of charts is exacerbated by the fact that in a manufacturing environment, such as a semiconductor fabrication facility, there are commonly multiple furnaces being tracked and also multiple types of other tools being tracked. Collectively, the number of control charts requiring updating and review can become resource intensive.

Another problem arising from the tracking of tools using multiple recipes is that, for those recipes that are infrequently used, the control chart has limited data, and thus limited information. Also, for a tool that changes recipes frequently, it may be difficult to identify certain long-term trends. Additionally, because the data for each particular recipe is less temporally related, certain multi-sample rule violations (e.g., rules 3 and 4) may be missed.

The present invention is directed to overcoming, or at least reducing the effects of, one or more of the problems set forth above.

SUMMARY OF THE INVENTION

One aspect of the present invention is seen in a method for monitoring the performance of a manufacturing entity. Metrology data indicating an output parameter of the manufacturing entity is retrieved. The output parameter has an associated target value. The metrology data is normalized based on the target value to generate normalized performance data points. A performance rule violation is determined based on the normalized performance data.

Another aspect of the present invention is seen in a manufacturing system including a metrology tool, a first database, and a processor. The metrology tool is adapted to measure an output parameter of a manufacturing entity to generate metrology data. The output parameter has an associated target value. The first database is adapted to receive the metrology data. The processor is adapted to retrieve the metrology data from the database, normalize the metrology data based on the target value to generate normalized performance data points, and determine a performance rule violation based on the normalized performance data.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
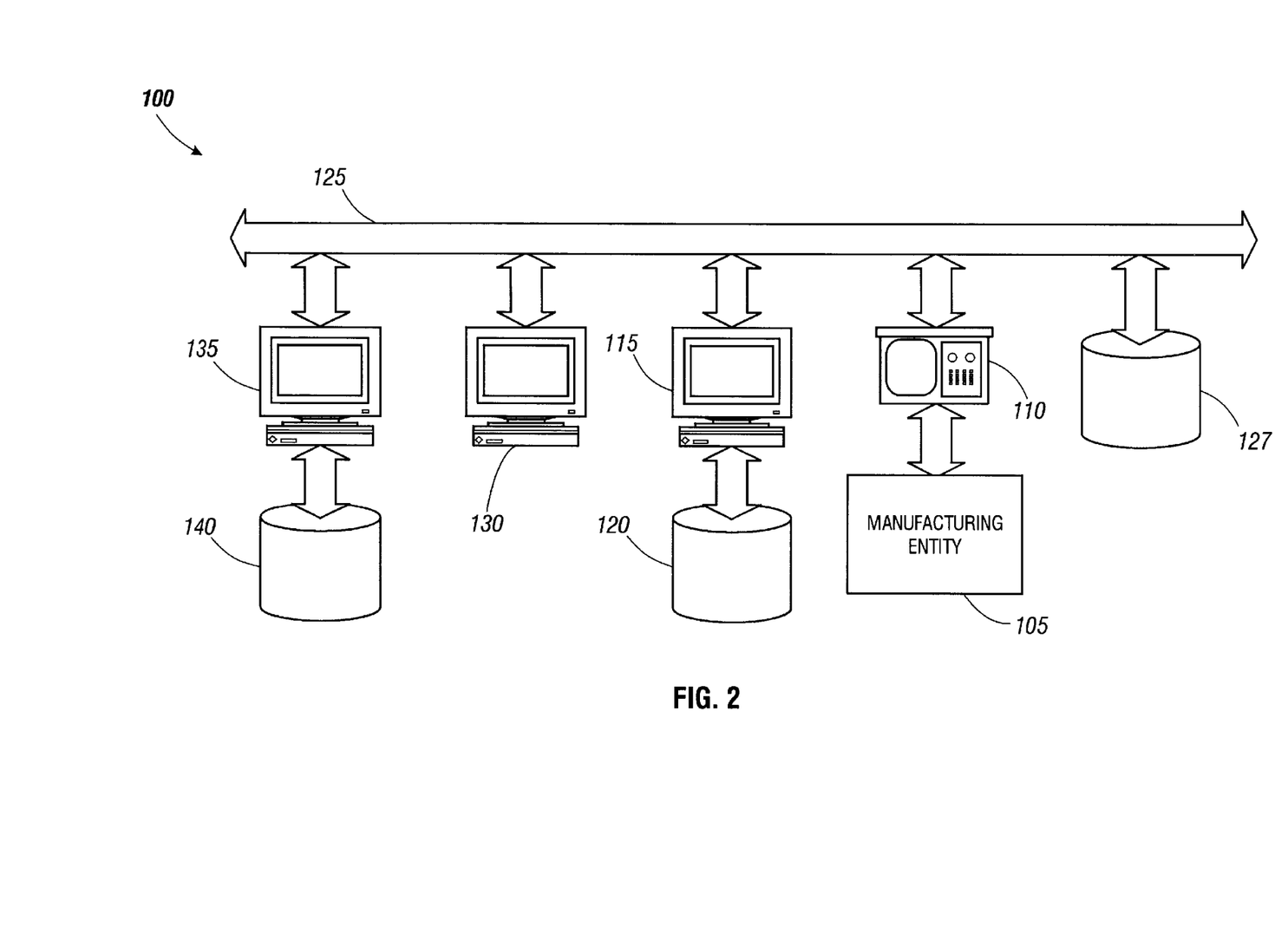
FIG. 2 is a block diagram of a manufacturing control system in accordance with the present invention.

Referring now to the Figures and, first, to FIG. 2, a block diagram of a manufacturing control system 100 is provided. The manufacturing control system 100 includes a manufacturing entity 105. The manufacturing entity 105 may represent a production line, a process, a manufacturing tool, or some other entity having quantifiable output parameters suitable for control charting. In the illustrated embodiment, the manufacturing entity 105 is a semiconductor processing tool, such as an oxide-forming furnace, and the manufacturing control system 100 is used to control various components in a semiconductor fabrication facility.

A metrology tool 110 evaluates an output parameter of the manufacturing entity 105 to measure a characteristic of the product. Although the application of the invention is not limited to a particular process or tool, for clarity and ease of illustration, the invention is described hereinafter as it may be applied to measurements (e.g., oxide thickness) taken to monitor the performance of a furnace used in the manufacture of semiconductor devices. Thus, the manufacturing entity 105 will be hereinafter referred to as the furnace 105 for exemplary illustration purposes. The manufacturing control system 100 includes a work-in-process (WIP) server 115 (e.g., a WorkStream server offered by Consillium, Inc.) having a database 120 for controlling various operations within the manufacturing control system 100. The WIP server 115 interfaces with various tools (e.g., the furnace 105) in the manufacturing control system 100. The manufacturing control system 100 also includes a communication bus 125 for coupling the various components of the system 100. The metrology tool 110 provides metrology data over the communication bus 125 to the WIP server 115 for each lot measured, and the WIP server 115 stores the data in a database 120. In addition, the metrology tool 110 provides at least a subset of the same data over the communication bus 125 to a file server 127 for each lot measured.

A client computer 130 coupled to the communication bus 125 executes statistical process control (SPC) software that retrieves the metrology data from the file server 127, analyzes the data as described in greater detail below, and transfers the processed SPC data to a database server 135. Hereinafter, the client computer 130 is referred to as an SPC client 130. The database server 135 also includes a database 140 for storing the processed SPC data. The database server 135 allows multiple SPC clients 130 to access the data centrally stored on the database 140. It is contemplated that the functions performed by the WIP server 115, SPC client 130, and the database server 135 may be consolidated onto fewer workstations (not shown) in a small manufacturing environment, or conversely, they may be distributed among more workstations (not shown) in a larger manufacturing environment.

An exemplary system for communicating and exchanging database information between various components in a manufacturing system, such as the manufacturing control system 100 detailed herein, is described in U.S. patent application Ser. No. 09/220,149, entitled "MESSAGING SYSTEM WITH PROTOCOL INDEPENDENT MESSAGE FORMAT" which is incorporated herein by reference in its entirety.

The furnace 105 is capable of using different manufacturing recipes, which may be changed frequently, as needed. Metrology data gathered by the metrology tool 110 is stored on the WIP server 115 and the file server 127 for each recipe. For example, the metrology tool 110 may take oxide thickness measurements in the top, bottom, center, left, and right locations on wafers in the front, middle, and rear of the furnace 105 for each lot. The SPC client 130 retrieves the metrology data from the file server 127 based on the entity number and determines output parameters (e.g., particle count, uniformity range, etc.). Because the furnace 105 may use different recipes for processing the semiconductor wafers, the target oxide thickness may vary. The output parameters are normalized based on those target values for the particular recipe, so that SPC data from all recipes may be controlled on a common control chart. One exemplary technique for normalizing the mean value is to determine the percent deviation from the target, as defined by the following equation:

$$\overline{X}_n = \frac{\overline{X} - Target}{Target}. \tag{1}$$

Figure 3:
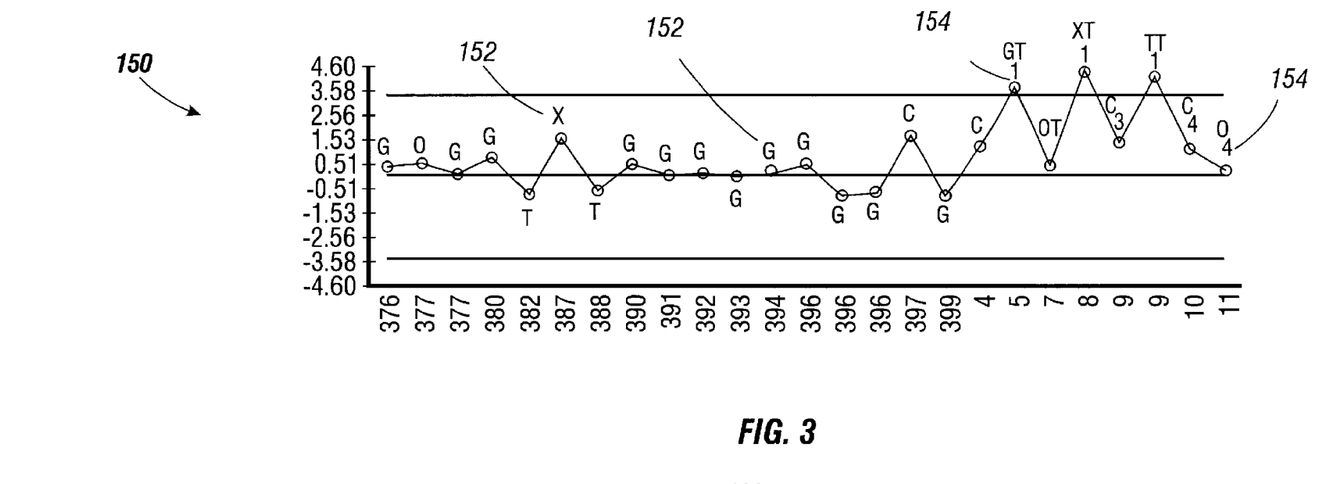
FIG. 3 is a diagram of a normalized mean control chart associated with the measurement tool of FIG. 2.
Figure 4:
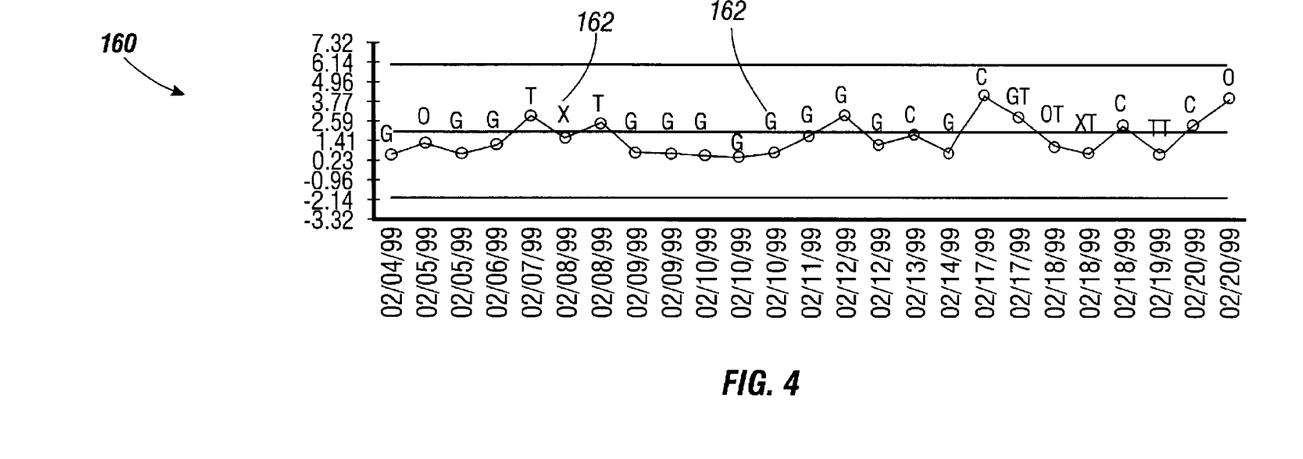
FIG. 4 is a diagram of a normalized range control chart associated with the mean control chart of FIG. 3.

As shown in FIGS. 3 and 4, respectively, the normalized mean data is included on a mean control chart 150, and the normalized range data is included on a range control chart 160. By normalizing the SPC data, the performance of the furnace 105 may be monitored independent of the recipe. Also, because all of the SPC data for all of the recipes is contained on common control charts 150, 160, it is less time-consuming to review the performance of the furnace 105. The specific recipe associated with particular data points is designated by letter codes 152, 162 located proximate the data points. The recipes shown in the control charts 150, 160 are designated by the letters "G", "O", "X", "T", and "C". Those data points where rule violations occur also include error codes 154 designating the particular error.

Figure 5:
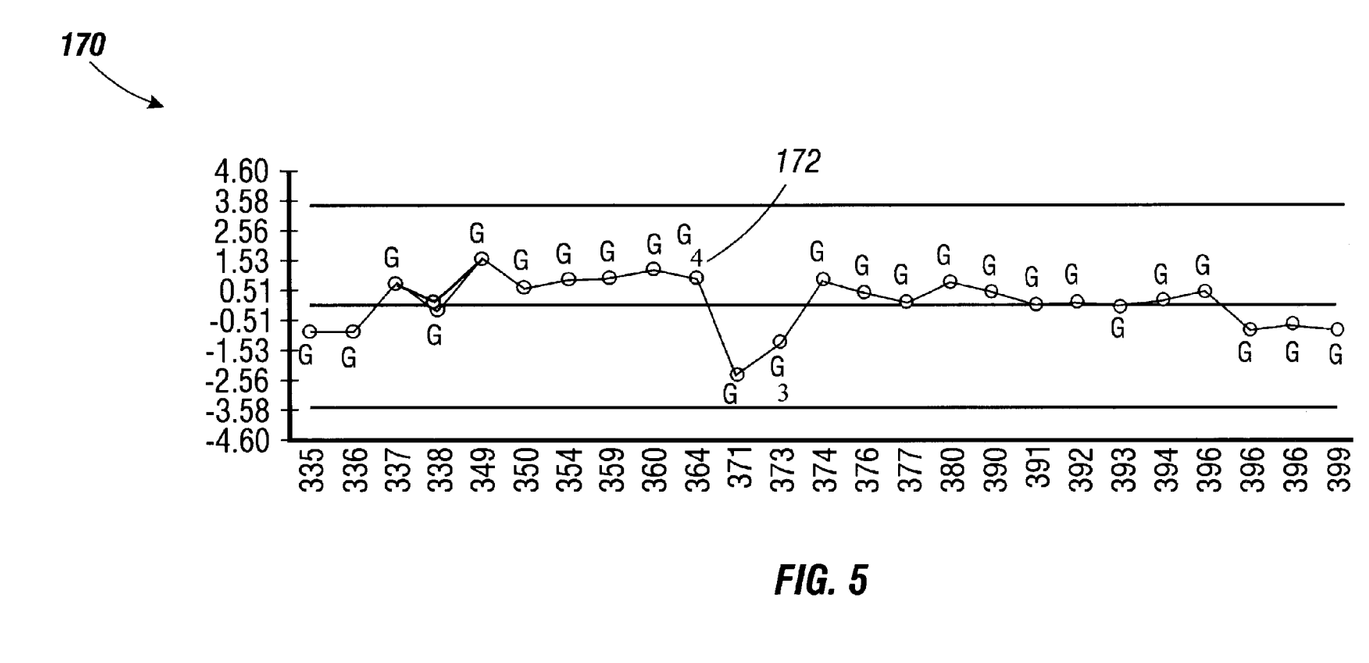
FIG. 5 is a diagram of the mean control chart of FIG. 3 with the data points for a particular recipe filtered.

If during the review process, the user at the SPC client 130 desires to filter a particular recipe, the control chart may be redrawn using only the data in a selected one or a subset of the recipes. FIG. 5 illustrates a control chart 170 based on the control chart of FIG. 3, with the data point for the "G" recipe filtered. Notice that on the filtered control chart 170, a rule 4 violation occurs at the data point 172, where in the aggregate control chart 150, no rule violation is present due to the intervening data points from recipes "X" and "T". It is contemplated that the SPC client 130 may identify rule violations based on the analysis of the aggregate data, the individual recipe data or both, depending on the particular application.

Returning to FIG. 2, in response to a rule violation, the SPC client 130 may be adapted to complete one or more of the following error routines. First, the SPC client 130 may send an e-mail to a designated owner for the furnace 105 indicating the faulted equipment and the type of error. It is contemplated that the e-mail may include a copy of the control chart 150 if desired.

Another error response initiated by the SPC client 130 may be to send a message to the WIP server 115 to log down the furnace 105, preventing further use until the error condition is explained, or some corrective action is taken. For example, the error might have resulted from a faulty temperature instrument in the furnace 105. This type of error would represent a special cause, that once rectified, should not affect further operation of the furnace 105. After correcting the faulty condition, the error condition is assigned a cause code, and the rule is reset (i e., further rule violations are monitored for data points occurring after the rectified error point forward). It is contemplated that the SPC software on the SPC client 130 may include a predetermined list (e.g., a drop down list) of error codes from which the user may select when assigning the cause code. It is also contemplated that the SPC software may include links to various troubleshooting guides for the furnace 105 that may be accessed directly from the SPC client 130 when an error condition is identified. Readily accessible error codes and troubleshooting guides simplify the investigation tasks necessary to rectify error conditions, and may thus reduce the down time experienced by the furnace 105.

Another significant aspect of statistical process control methods lies in long-term trend evaluation. The performance of a particular tool, such as the furnace 105, may drift over time, but not sufficiently to trigger a rule violation. The SPC software executing on the SPC client 130 includes a trending feature that prompts a user, or designated owner, to perform a periodic review. In the illustrated embodiment, the required review frequency is eight weeks, although other frequencies are contemplated, based on the particular application. If the trending data is not reviewed in the eight week period, the furnace 105 SPC software prevents further data input to the control charts 150, 160 for all recipes run on the furnace 105.

Figure 6:
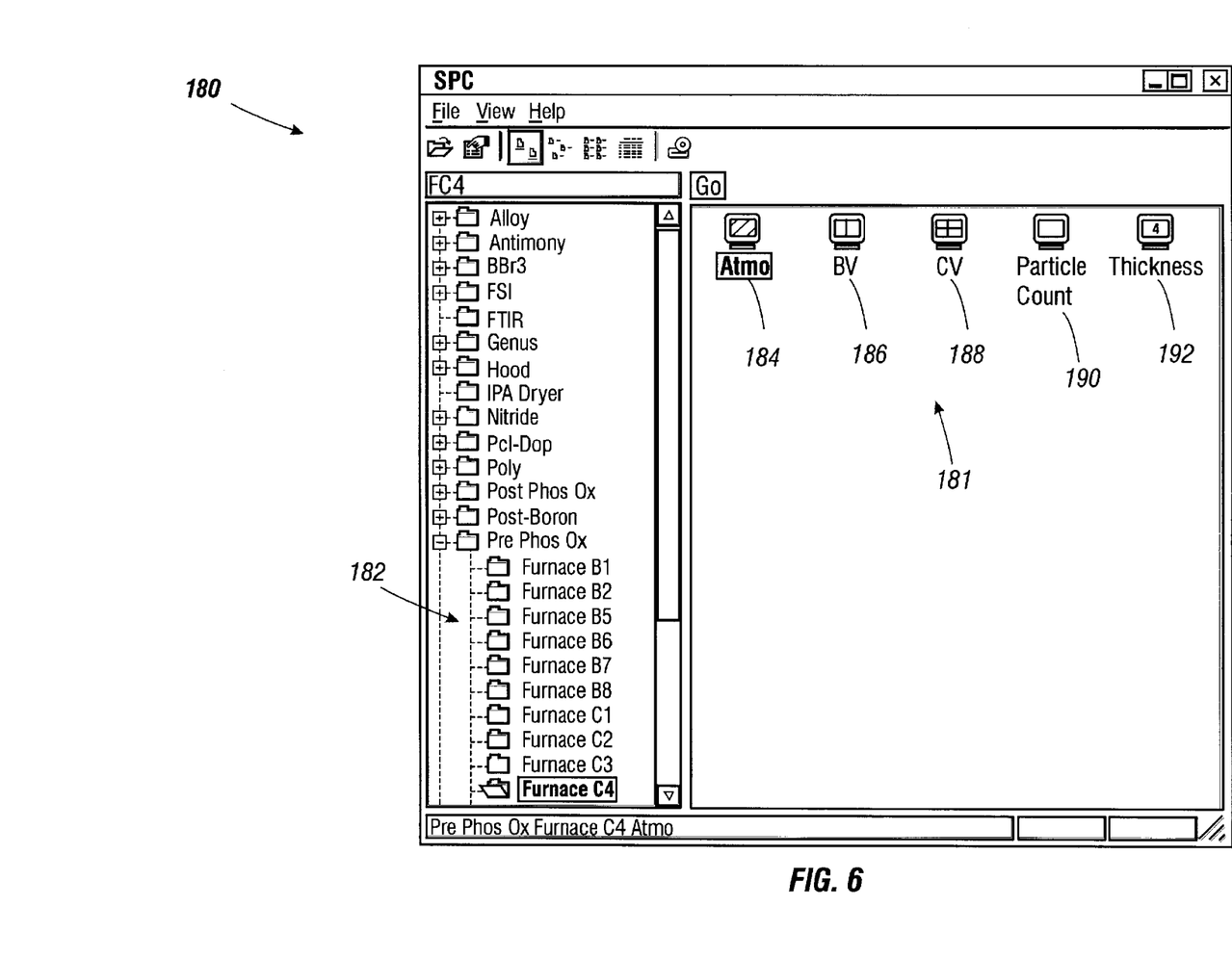
FIG. 6 is a diagram of a summary display for presenting error and trending review information for the measurement tool of FIG. 2.

FIG. 6 illustrates a summary display 180 for the furnace 105. Summaries for other tools (not shown) are also accessible by selecting the tool list 182. Each of the output parameters charted for the furnace 105 are represented by summary icons 181. The output parameters charted include a measurement of the ambient oxidation caused by atmospheric leakage into the furnace (Atmo), the breakdown voltage (BV), the capacitive voltage (CV), the number of defects added to the wafer (particle count), and the oxide thickness of the processed wafers (thickness). These performance output parameters are represented by an Atmo icon 184, a BV icon 186, a CV icon 188, a particle count icon 190, and a thickness icon 192.

The summary icons 181 may be color coded to indicate their respective trending review statuses. For example, if the summary icon 181 is green, the trending review has been completed and the new trending period has been entered. If the summary icon 181 is yellow, it has been at least six seeks since the previous review. The yellow indicator alerts the designated owner of the pending review deadline. A red summary icon 181 indicates that the trending review period has been exceeded and that no other data may be entered prior to completing the review. The trending reviews may be performed at any time during the review interval. It is contemplated that the SPC client 130 may send an e-mail to the designated owner for every color change to inform the owner of the trending review status.

The summary icons 181 also convey rule violation information. The Atmo icon 184 indicates a rule 1 violation, and the thickness icon 192 indicates a rule 4 violation. After cause codes are assigned to the pending rule violations, the rules are reset and the rule indicator in the summary icon 184, 192 is cleared. Providing the trending review status and the rule violation on the summary display 180 gives an overview of the performance of the tool (e.g., the furnace 105), thus further increasing the efficiency at which the monitoring function can be performed.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for monitoring the performance of a manufacturing entity configured to operate in accordance with a plurality of manufacturing recipes, comprising:

retrieving metrology data indicating output parameters of the manufacturing entity, each output parameter having an associated target value corresponding to a particular one of the manufacturing recipes used to operate the manufacturing entity;

normalizing the metrology data based on the target value to generate normalized performance data points; and determining a performance rule violation based on the normalized performance data.

2. The method of claim 1, wherein normalizing the metrology data includes determining a percent deviation between the metrology data and the target value.

3. The method of claim 1, wherein determining the performance rule violation includes determining if one of the normalized performance data points has an associated standard deviation of about at least three sigma.

4. The method of claim 1, wherein determining the performance rule violation includes determining if two out of three consecutive normalized performance data points have associated standard deviations of about at least two sigma.

5. The method of claim 1, wherein determining the performance rule violation includes determining if four out of five consecutive normalized performance data points have associated standard deviations of about at least one sigma.

6. The method of claim 1, wherein determining the performance rule violation includes determining if at least eight consecutive normalized performance data points have the same sign deviation from the target value.

7. The method of claim 1, wherein the metrology data includes a first set of metrology data associated with a first target value and a second set of metrology data associated with a second target value, and normalizing the metrology data includes normalizing the first set based on the first target value and normalizing the second set based on the second target value.

8. The method of claim 1, further comprising preventing further operation of the manufacturing entity in response to determining the performance rule violation.

9. The method of claim 8, wherein preventing farther operation of the manufacturing entity includes sending a message to a work-in-process server indicating the performance rule violation.

10. The method of claim 1, further comprising sending a rule violation message to a designated owner of the manufacturing entity in response to determining the performance rule violation.

11. The method of claim 1, further comprising preventing collection of the metrology data pending a periodic review of the normalized performance data points.

12. The method of claim 11, wherein preventing collection of the metrology data pending the periodic review includes preventing collection of the metrology data if the periodic review interval exceeds about eight weeks.

13. The method of claim 12, further comprising providing a warning of the impending preventing of metrology data collection if the periodic review interval exceeds about six weeks.

14. A manufacturing system, comprising:
a metrology tool adapted to measure output parameters of a manufacturing entity configured to operate in accordance with a plurality of manufacturing recipes to generate metrology data, each output parameter having an associated target value corresponding to a particular one of the manufacturing recipes used to operate the manufacturing entity;
a first database adapted to receive the metrology data; and
a processor adapted to retrieve the metrology data from the database, normalize the metrology data based on the target value to generate normalized performance data points, and determine a performance rule violation based on the normalized performance data.

15. The manufacturing system of claim 14, further comprising a second database adapted to store the normalized performance data.

16. The manufacturing system of claim 14, further comprising a bus coupling the metrology tool, the first database and the processor.

17. The manufacturing system of claim 14, wherein the processor is adapted to normalize the metrology data by determining a percent deviation between the metrology data and the target value.

18. The manufacturing system of claim 14, wherein the processor is adapted to determine the performance rule violation by determining if one of the normalized performance data points has an associated standard deviation of about at least three sigma.

19. The manufacturing system of claim 14, wherein the processor is adapted to determine the performance rule violation by determining if two out of three consecutive normalized performance data points have associated standard deviations of about at least two sigma.

20. The manufacturing system of claim 14, wherein the processor is adapted to determine the performance rule violation by determining if four out of five consecutive normalized performance data points have associated standard deviations of about at least one sigma.

21. The manufacturing system of claim 14, wherein the processor is adapted to determine the performance rule violation by determining if at least eight consecutive normalized performance data points have the same sign deviation from the target value.

22. The manufacturing system of claim 14, wherein the metrology data includes a first set of metrology data associated with a first target value and a second set of metrology data associated with a second target value, and the processor is adapted to normalize the first set of metrology data based on the first target value and normalize the second set based on the second target value.

23. The manufacturing system of claim 14, wherein the processor is further adapted to prevent further operation of the manufacturing entity in response to the performance rule violation.

24. The manufacturing system of claim 23, further comprising a work-in-process server adapted to control the manufacturing entity, wherein the processor is adapted to send a message to the work-in-process server indicating the performance rule violation.

25. The manufacturing system of claim 14, wherein the processor is adapted to send a rule violation message to a designated owner of the manufacturing entity in response to the performance rule violation.

26. The manufacturing system of claim 14, wherein the processor is further adapted to prevent collection of the metrology data pending a periodic review of the normalized performance data points.

27. The manufacturing system of claim 26, wherein the periodic review has a frequency of about eight weeks.

28. The manufacturing system of claim 27, wherein the processor is further adapted to provide a warning of the impending preventing of metrology data collection if the periodic review interval exceeds about six weeks.

29. A manufacturing system for monitoring the performance of a manufacturing entity configured to operate in accordance with a plurality of manufacturing recipes, comprising:
a processor; and
a program storage device encoded with instructions that, when executed by the processor, perform a method, comprising
retrieving metrology data indicating output parameters of the manufacturing entity, each output parameter having an associated target value corresponding to a particular one of the manufacturing recipes used to operate the manufacturing entity;
normalizing the metrology data based on the target value to generate normalized performance data points; and
determining a performance rule violation based on the normalized performance data.

30. The manufacturing system of claim 29, wherein normalizing the metrology data in the method includes determining a percent deviation between the metrology data and the target value.

31. The manufacturing system of claim 29, wherein determining the performance rule violation in the method includes determining if one of the normalized performance data points has an associated standard deviation of about at least three sigma.

32. The manufacturing system of claim 29, wherein determining the performance rule violation in the method includes determining if two out of three consecutive normalized performance data points have associated standard deviations of about at least two sigma.

33. The manufacturing system of claim 29, wherein determining the performance rule violation in the method includes determining if four out of five consecutive normalized performance data points have associated standard deviations of about at least one sigma.

34. The manufacturing system of claim 29, wherein determining the performance rule violation in the method includes determining if at least eight consecutive normalized performance data points have the same sign deviation from the target value.

35. The manufacturing system of claim 29, wherein the metrology data includes a first set of metrology data associated with a first target value and a second set of metrology data associated with a second target value, and normalizing the metrology data in the method includes normalizing the first set based on the first target value and normalizing the second set based on the second target value.

36. The manufacturing system of claim 29, the method further comprising preventing further operation of the manufacturing entity in response to determining the performance rule violation.

37. The manufacturing system of claim 29, wherein preventing further operation of the manufacturing entity in the method includes sending a message to a work-in-process server indicating the performance rule violation.

38. The manufacturing system of claim 29, the method further comprising sending a rule violation message to a designated owner of the manufacturing entity in response to determining the performance rule violation.

39. The manufacturing system of claim 29, the method further comprising preventing collection of the metrology data pending a periodic review of the normalized performance data points.

40. The manufacturing system of claim 39, wherein preventing collection of the metrology data pending the periodic review in the method includes preventing collection of the metrology data if the periodic review interval exceeds eight weeks.

41. The manufacturing system of claim 40, the method further comprising providing a warning of the impending preventing of metrology data collection if the periodic review interval exceeds about six weeks.

42. A manufacturing system for monitoring the performance of a manufacturing entity configured to operate in accordance with a plurality of manufacturing recipes, comprising:

means for retrieving metrology data indicating output parameters of the manufacturing entity, each output parameter having an associated target value corresponding to a particular one of the manufacturing recipes used to operate the manufacturing entity;

means for normalizing the metrology data based on the target value to generate normalized performance data points; and means for determining a performance rule violation based on the normalized performance data.

* * * * *

UNITED STATES PATENT AND TRADEMARK OFFICE
CERTIFICATE OF CORRECTION

PATENT NO. : 6,424,876 B1
DATED : July 23, 2002
INVENTOR(S) : Cusson et al.

It is certified that error appears in the above-identified patent and that said Letters Patent is hereby corrected as shown below:

Column 1,
Line 7, delete "farther" and insert -- further --

Column 2,
Line 20, delete "." between "message" and "to"

Signed and Sealed this

Nineteenth Day of November, 2002

Attest:

Attesting Officer

JAMES E. ROGAN
Director of the United States Patent and Trademark Office